United States Patent [19]

Yates et al.

[11] 4,300,901
[45] Nov. 17, 1981

[54] LIQUID FORM OF DYESTUFFS

[75] Inventors: Brian L. Yates, Manchester; Malcolm C. Clark, Heald Green, both of England

[73] Assignee: Ciba-Geigy Corporation, Ardsley, N.Y.

[21] Appl. No.: 153,641

[22] Filed: May 27, 1980

[30] Foreign Application Priority Data

Jun. 5, 1979 [GB] United Kingdom ............... 19622/79

[51] Int. Cl.³ ............................................. D06P 67/00
[52] U.S. Cl. ............................................ 8/527; 8/636;
8/663; 8/680; 8/691; 8/919; 8/937
[58] Field of Search ................... 8/527, 636, 663, 680,
8/688, 918, 919, 937, 691

[56] References Cited

U.S. PATENT DOCUMENTS 3,108,109 10/1963 Clarke ................................. 546/101

FOREIGN PATENT DOCUMENTS 7507302 12/1975 Netherlands .
1027616 4/1966 United Kingdom .
1165311 9/1969 United Kingdom .

Primary Examiner—A. Lionel Clingman
Attorney, Agent, or Firm—John P. Spitals; Edward McC. Roberts

[57] ABSTRACT

A liquid dyestuff composition, especially suitable for dyeing paper, comprises:
(a) 5–40% by weight of a dyestuff having the formula:

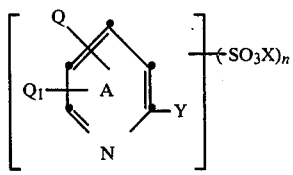

wherein X is hydrogen or an alkali metal cation, n represents an integer from 1 to 2, Q and $Q_1$ together form a fused benzene or naphthalene residue, and Y is a residue having the formula

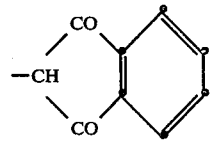

whereby ring A, the fused residue formed by Q and $Q_1$, or the residue Y can each be further substituted by one or more alkyl, alkoxy, hydroxy, carboxy or dehydrothio-p-toluidine groups or halogen atoms;
(b) 1–10% by weight of an alkali metal hydroxide;
(c) 45–75% by weight of a polyhydric alcohol or a water-soluble ether thereof; and
(d) 0–40% by weight of water.

10 Claims, No Drawings

LIQUID FORM OF DYESTUFFS

The present invention relates to new liquid forms of dyestuffs.

According to the present invention there is provided a liquid dyestuff composition comprising (a) 5-40% by weight of a dyestuff having the formula

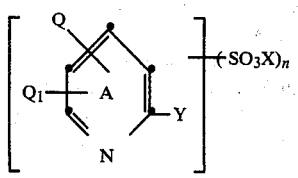

I wherein X is hydrogen or an alkali metal cation, n represents an integer from 1 to 2, Q and $Q_1$ together form a fused benzene or naphthalene residue, and Y is a residue having the formula

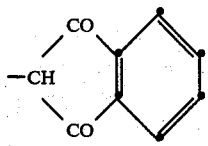

whereby ring A, the fused residue formed by Q and $Q_1$, or the residue Y can each be further substituted by one or more alkyl, alkoxy, hydroxy, carboxy or dehydrothio-p-toluidine groups or halogen atoms;

(b) 1-10% by weight of an alkali metal hydroxide;
(c) 45-75% by weight of a polyhydric alcohol or a water-soluble ether thereof; and
(d) 0-40% by weight of water.

Preferred dyestuffs of formula I are those having the formula

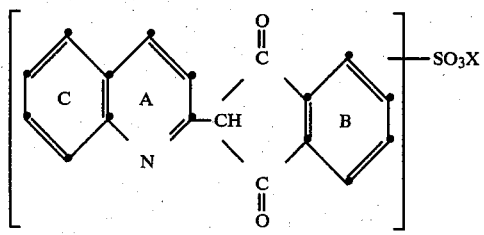

IA wherein A and X have their previous significance and benzene ring C optionally carries a fused benzene ring.

Particularly preferred dyestuffs of formula I are those having the formula

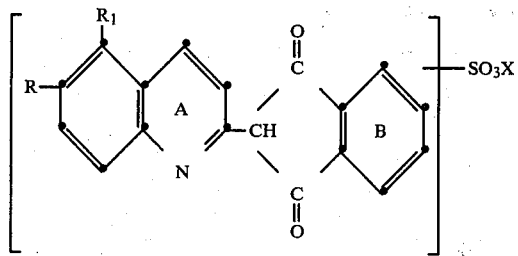

IB wherein A, B and X have their previous significance and R and $R_1$ are each a hydrogen atom; or $R_1$ is a hydrogen atom and R is methyl or a dehydrothio-p-toluidine residue; or R and $R_1$ together are the atoms required to form a fused benzene ring.

The alkali metal hydroxide used as component (b) of the new compositions is e.g. lithium hydroxide, sodium hydroxide or, preferably, potassium hydroxide.

The polyhydric alcohol (or ether thereof) used as component (c) may be any such compound which is liquid at ambient temperature and pressure. Examples of suitable alcohols are ethylene glycol and its methyl-, ethyl-, propyl- and butyl ethers; diethylene glycol and its methyl-, ethyl-, propyl- and butyl ethers; propylene glycol; as well as polyethylene glycols of sufficiently low molecular weight that it is liquid at ambient temperature.

The present invention also provides a process for producing a liquid dyestuff composition comprising mixing, in the defined proportions, the components (a), (b), (c) and (d), as defined hereinbefore; heating the mixture until a homogeneous solution is obtained; and optionally filtering the homogeneous solution to remove any suspended matter.

The new liquid dye formulations are eminently suitable for the colouration of cellulosic material especially paper. The new formulations exhibit a very high optimal dyestuff concentration and are free from materials, e.g. organic amine derivatives, such as ethanolamines, which can cause environmental problems. In addition, of course, relative to dyes in the form of dry powders, they exhibit the usual advantages of liquid formulations viz. freedom from dusting and easy handling and metering.

The following Examples further illustrate the present invention.

EXAMPLE 1

The dried concentrated colour (constitution as shown below) (100 parts)

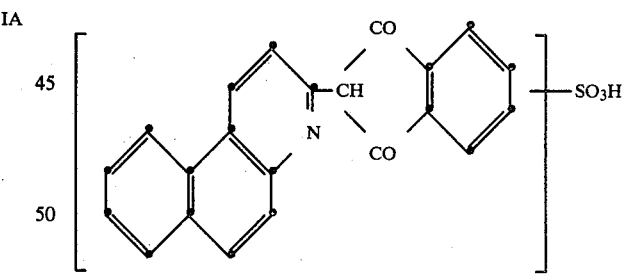

as filter cake is mixed with stirring with sufficient water to make the total water content equal to 185 parts together with 400 parts of polyethylene glycol 200; then 25 parts of potassium hydroxide are added, the whole stirred for 2 hours at 55°-60° C. and then filtered to remove inorganic materials, e.g. sodium sulphate and slight amounts of insoluble organic matter, whence a stable red liquid is obtained, having the composition:
water=26%
dyestuff=14%
polyethylene glycol=56.5%
KOH=3.5%.

The liquid can be dyed at room temperature as a 0.5% shade on air-dried bleached paper pulp, to give a bright greenish-yellow shade. Alternatively, the paper can be pre-sized e.g. with 5% 'T Size 22' and the liquid then dyed as a 0.5% shade in the presence of 4% (on wt. pulp) of aluminium sulphate.

EXAMPLE 2

The dyestuff having the constitution below (100 parts dried concentrated colour), as filter cake,

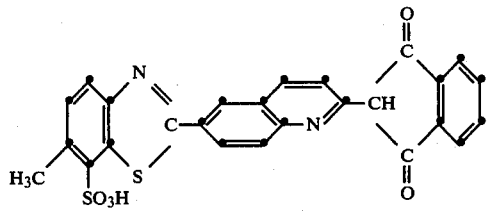

is treated as in Example 1, to afford a stable red liquid, which dyes paper a bright yellow shade, and having the analogous composition as the dye liquid of Example 1.

EXAMPLE 3

The dyestuff having the constitution below (100 parts dried concentrated colour),

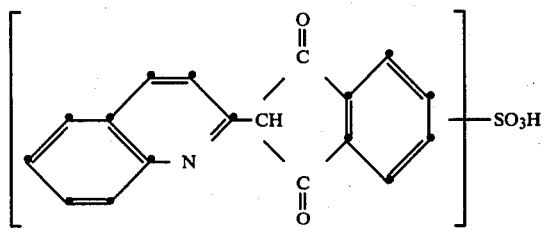

as filter cake is treated as in Example 1, to afford a stable red liquid, which dyes paper a greenish-yellow shade, but which is of inferior substantivity, under sized or non-sized conditions, to the dye liquids described in Example 1 or 2.

EXAMPLE 4

The dyestuff described in Example 1 (100 parts dried concentrated colour), as filter cake, is treated with diethylene glycol monoethyl ether (400 parts) and lithium hydroxide (25 parts), at 60° C. for 2 hours and clarified to give a stable red liquid which dyes paper a bright greenish yellow shade, and has a composition analogous to the dye liquid described in Example 1.

EXAMPLE 5

The dyestuff described in Example 2 (100 parts dried concentrated colour), as filter cake, is mixed, with stirring, with sufficient water to provide a total water content equal to 300 parts and 550 parts of polyethylene glycol 200; then potassium hydroxide (50 parts) is added, the whole is stirred for 2 hours at 55°–60° C. and then filtered to remove inorganic materials. A stable red liquid is obtained having the following composition:
water = 30%
dyestuff = 10%
polyethylene glycol = 55%
KOH = 5%.

What is claimed is:
1. A liquid dyestuff composition comprising
(a) 5–40% by weight of a dyestuff having the formula

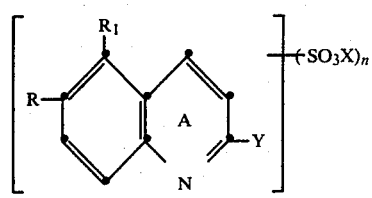

wherein X is hydrogen or an alkali metal cation, n represents 1 or 2, $R_1$ is a hydrogen atom and R is methyl or a dehydrothio-p-toluidine residue; or R and $R_1$ together are the atoms required to form a fused benzene ring, and Y is a residue having the formula

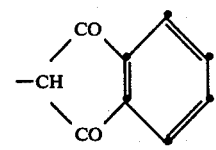

whereby ring A, the fused residue formed by R and $R_1$, or the residue Y can each be further substituted by one or more alkyl, alkoxy, hydroxy, carboxy or dehydrothio-p-toluidine groups or halogen atoms;
(b) 1–10% by weight of an alkali metal hydroxide;
(c) 45–75% by weight of a polyhydric alcohol or a water-soluble ether thereof; and
(d) 0–40% by weight of water.

2. The composition of claim 1 wherein the dyestuff has the formula

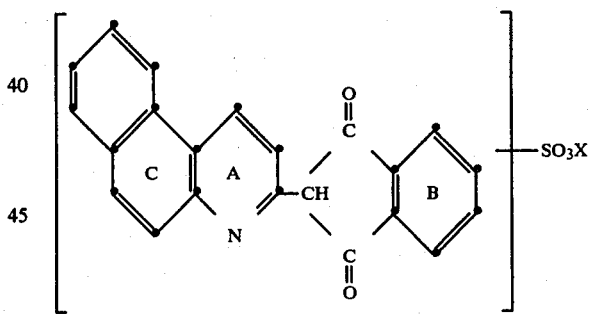

wherein ring A and X are as defined in claim 11.

3. The composition of claim 1 wherein the dyestuff has the formula

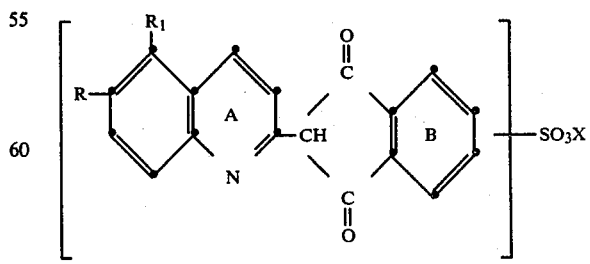

wherein ring A and X are as defined in claim 11, and $R_1$ is a hydrogen atom and R is methyl or a dehydrothio-p-toluidine residue.

4. The composition of claim 1 wherein the alkali metal hydroxide is lithium hydroxide or sodium hydroxide.

5. The composition of claim 1 wherein the alkali metal hydroxide is potassium hydroxide.

6. The composition of claim 1 wherein the polyhydric alcohol or ether thereof is ethylene glycol or its methyl-, ethyl-, propyl- or butyl ether; diethylene glycol or its methyl-, ethyl-, propyl- or butyl ether; propylene glycol; or a polyethylene glycol of sufficiently low molecular weight that it is liquid at ambient temperature.

7. A process for producing the liquid dyestuff composition according to claim 1, comprising mixing, in the proportions defined in claim 1, the components (a), (b), (c) and (d), as defined in claim 1; heating the mixture until a homogeneous solution is obtained; and optionally filtering the solution to remove any suspended matter.

8. The liquid dyestuff composition produced by the process of claim 7.

9. A method of dyeing cellulosic material comprising contacting the cellulosic material with the liquid dyestuff composition of claim 1.

10. The method of claim 9 wherein the cellulosic material is paper.

* * * * *